US008914957B2

(12) United States Patent
Park et al.

(10) Patent No.: US 8,914,957 B2
(45) Date of Patent: Dec. 23, 2014

(54) CAPSULE TYPE RECONFIGURABLE MULTIFUNCTIONAL MACHINING APPARATUS

(71) Applicant: Korea Institute of Machinery & Materials, Daejeon (KR)

(72) Inventors: Jong-Kweon Park, Daejeon (KR); Sung Cheul Lee, Daejeon (KR); Byung-Sub Kim, Daejeon (KR); Seung Kook Ro, Daejeon (KR); Sung Kwon Jang, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 264 days.

(21) Appl. No.: 13/707,982

(22) Filed: Dec. 7, 2012

(65) Prior Publication Data

US 2014/0109367 A1    Apr. 24, 2014

(30) Foreign Application Priority Data

Oct. 23, 2012    (KR) .................. 10-2012-0117659

(51) Int. Cl.

| | | |
|---|---|---|
| *B23P 23/02* | (2006.01) | |
| *B23C 1/12* | (2006.01) | |
| *B23C 1/14* | (2006.01) | |
| *B24B 7/04* | (2006.01) | |
| *B23K 28/02* | (2014.01) | |
| *B23Q 1/01* | (2006.01) | |

(Continued)

(52) U.S. Cl.
CPC . *B23Q 39/02* (2013.01); *B24B 7/04* (2013.01); *B23K 26/0823* (2013.01);

(Continued)

(58) Field of Classification Search
CPC ... B23Q 39/025; B23Q 39/027; B23Q 39/026
USPC .............. 29/56.5, 35.5, 33 J, 50, 26 R, 26 A, 29/DIG. 86; 451/69; 408/35; 409/201, 211, 409/216, 235, 141, 134, 217
See application file for complete search history.

(56) References Cited

U.S. PATENT DOCUMENTS

| | | | |
|---|---|---|---|
| 2,948,168 A | 8/1960 | Mccormick | |
| 3,835,527 A * | 9/1974 | Cornair | ......................... 29/560 |

(Continued)

FOREIGN PATENT DOCUMENTS

| | | |
|---|---|---|
| EP | 1291122 | 3/2003 |
| EP | 2 386 382 | 11/2011 |

(Continued)

*Primary Examiner* — Erica E Cadugan
(74) *Attorney, Agent, or Firm* — Lexyoume IP Meister, PLLC

(57) ABSTRACT

A capsule type reconfigurable multifunctional machining apparatus is disclosed. A capsule type reconfigurable multifunctional machining apparatus includes a rotating frame in which a plurality of processing modules may be installed to face an object to be machined disposed in a capsule type body and whose machining position and pose are controlled by rotation, a top frame for rotatably supporting the rotating frame, a bottom frame that is combined with the top frame under the top frame to support the top frame and in which vibration proof members are installed in positions where the bottom frame contacts the top frame, and a stage unit fixedly inserted into the internal center of the top frame to settle the object to be machined so that the height of the settled object to be machined may be controlled and in which an X-Y stage or a rotary stage may be selectively mounted.

11 Claims, 13 Drawing Sheets

(51) Int. Cl.

| | | |
|---|---|---|
| *B23Q 39/02* | (2006.01) | |
| *B23K 26/08* | (2014.01) | |
| *B23K 26/00* | (2014.01) | |
| *B23Q 11/08* | (2006.01) | |
| *B23Q 1/44* | (2006.01) | |
| *B23K 26/12* | (2014.01) | |
| *B24B 27/00* | (2006.01) | |
| *B23Q 11/00* | (2006.01) | |

(52) U.S. Cl.
CPC ........ *B23K 26/0093* (2013.01); *B23Q 11/0891* (2013.01); *B23Q 39/027* (2013.01); *B23Q 1/44* (2013.01); *B23K 26/127* (2013.01); *B23C 1/12* (2013.01); *B24B 27/0084* (2013.01); *B23P 23/02* (2013.01); *B23Q 1/01* (2013.01); *B23Q 1/015* (2013.01); *B23Q 11/0032* (2013.01); *B23Q 39/026* (2013.01); *Y10S 29/086* (2013.01)
USPC ......... 29/56.5; 29/DIG. 86; 29/35.5; 29/26 A; 409/141; 409/235; 409/217; 409/134; 409/201; 409/165; 451/69; 219/121.67

(56) References Cited

U.S. PATENT DOCUMENTS

| | | | |
|---|---|---|---|
| 5,190,384 A * | 3/1993 | Speicher | 400/128 |
| 5,943,750 A * | 8/1999 | Koren et al. | 29/26 A |
| 7,185,412 B2 | 3/2007 | Penick | |
| 7,293,337 B2 * | 11/2007 | Hosoe | 29/28 |
| 7,845,257 B2 * | 12/2010 | Kim et al. | 82/118 |
| 8,152,423 B2 | 4/2012 | Park | |
| 2011/0280680 A1 | 11/2011 | Park | |
| 2014/0023450 A1 * | 1/2014 | Park et al. | 409/216 |

FOREIGN PATENT DOCUMENTS

| | | |
|---|---|---|
| JP | 62-39933 | 3/1987 |
| JP | 04-201142 | 7/1992 |
| JP | 07-024677 | 1/1995 |
| JP | 07-256575 | 10/1995 |
| JP | 08-187636 | 7/1996 |
| JP | 4316850 | 4/2004 |
| JP | 2006-239813 | 9/2006 |
| JP | 2010-058239 | 3/2010 |
| JP | 2010-105146 | 5/2010 |
| JP | 2011-240480 | 12/2011 |
| KR | 10-0502457 | 7/2003 |
| KR | 10-0471749 | 2/2005 |
| KR | 10-0609478 | 6/2006 |
| KR | 10-2009-0005548 | 1/2009 |
| KR | 10-2011-0125938 | 11/2011 |
| KR | 10-1144621 | 11/2011 |
| KR | 10-2012-0090196 | 8/2012 |
| WO | 03-068449 | 8/2003 |
| WO | WO-2010119087 A2 * | 10/2010 |

* cited by examiner

CAPSULE TYPE RECONFIGURABLE MULTIFUNCTIONAL MACHINING APPARATUS

CROSS-REFERENCE TO RELATED APPLICATION

This application claims priority to and the benefit of Korean Patent Application No. 10-2012-0117659 filed in the Korean Intellectual Property Office on Oct. 23, 2012, the entire contents of which are incorporated herein by reference.

BACKGROUND OF THE INVENTION (a) Field of the Invention

The present invention relates to a capsule type reconfigurable multifunctional machining apparatus. More particularly, the present invention relates to a capsule type reconfigurable multifunctional machining apparatus capable of multiply performing various processes (for example, a laser process, a milling process, and a grinding process) by applying a mechanism in which a rotary motion is maximized.

(b) Description of the Related Art

Representative machining apparatuses used for three-dimensional machining of an object include a laser machining apparatus and a multi-axis machining apparatus. The laser machining apparatus is mainly used for machining a small object rather than a large object. The multi-axis machining apparatus is mainly used for machining a larger object than the object machined by the laser machining apparatus.

A conventional multi-axis machining apparatus commonly has a large volume and a tool is commonly moved to the periphery of an object to be machined in order to three-dimensionally machine the object. Therefore, since the travel range of the tool increases so that a remarkable machining error may be generated, it is difficult to machine a relatively elaborate and complicated product.

In addition, since a conventional multi-axis machining apparatus mostly moves a tool only by multi-axis translation motion to perform machining, the apparatus has a complicated structure and includes a large number of parts so that the apparatus is expensive.

Since the conventional multi-axis machining apparatus is required to move the tool more when a product of a complicated shape is machined, there is a drawback in which energy used for moving the tool unnecessarily increases.

Therefore, in order to solve the problem and inconvenience of the conventional multi-axis machining apparatus, it is required to develop a machining apparatus capable of performing reconfigurable multifunctional machining in a single machining apparatus.

The development of the reconfigurable multifunctional machining apparatus may bring the development of a next generation bio technology and information technology (IT) micromachining field.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a capsule type reconfigurable multifunctional machining apparatus capable of multiply performing various processes such as a laser process, a milling process, and a grinding process by applying a mechanism in which a motion is maximized.

According to an exemplary embodiment of the present invention, there is provided a capsule type reconfigurable machining apparatus, including a rotating frame in which a plurality of processing modules may be installed to face an object to be machined disposed in a capsule type body and whose machining position and pose are controlled by rotation, a top frame for rotatably supporting the rotating frame, a bottom frame that is combined with the top frame under the top frame to support the top frame and in which vibration proof members are installed in positions where the bottom frame contacts the top frame, and a stage unit fixedly inserted into the internal center of the top frame to settle the object to be machined so that the height of the settled object to be machined may be controlled and in which an X-Y stage or a rotary stage may be selectively mounted.

The rotating frame may include a laser processing module mounting slot in which a laser processing module is mounted in a direction vertical to a rotating direction of the rotating frame of the capsule type body and a milling processing module mounting slot and a grinding processing module mounting slot that are separated from the laser processing module back and forth in the rotating direction of the rotating frame and in which the milling processing module and the grinding processing module are mounted, respectively.

The capsule type body includes an arc type cut part cut back and forth in the rotating direction from a center to a lower end in a height direction. The stage unit that protrudes upward through the arc type cut part and the rotating capsule type body do not interfere each other.

In addition, weight balances may be provided on both ends of the arc type cut part to fill an internal space of the capsule type body.

The vibration proof members may be aircushions positioned in the same line to correspond to the height of the driving shaft of the rotating frame and are disposed at edges of a rectangle in which the top frame and the bottom frame contact each other.

In addition, the vibration proof members are fixed to the protruding ends that protrude upward from the edges of the rectangle. Pocket-shaped supporting ground plates into which the protruding ends are inserted and that contact the vibration proof members to face the vibration proof members are provided at the edges of the rectangle of the top frame.

In addition, rotating frame drivers for transmitting torque through driving shafts connected to the both sides of the rotating frame may be mounted in the top frame.

The stage unit is fixedly inserted into a stage unit mounting unit provided in the top frame. The stage unit may include a connecting plate fixed to the stage unit mounting unit, an ascending shaft mounted in a vertical direction through a center of the connecting plate to expand up and down by torque received an ascending driver at a lower end, and an X-Y stage that is connected to an upper end of the ascending shaft and to whose top surface a support block in which an object to be machined is settled is fixed to move the object to be machined in an X-Y axes direction.

In addition, the stage unit may include a rotary stage driver mounted in the upper end of the ascending shaft and a rotary stage for receiving torque from the rotary stage driver to rotate the object to be machined.

At this time, the rotary stage may be a chuck member including a plurality of jaws, may separate the support block fixed to the X-Y stage, and may be mounted in a groove provided in the X-Y stage.

In addition, the stage unit may include a plurality of guide rods in a direction where the ascending shaft expands. In a capsule type reconfigurable multifunctional machining apparatus according to an exemplary embodiment of the present invention, a reconfigurable driving mechanism in which a rotary motion is maximized is applied deviating from the conventional linear motion based machining mechanism so that more elaborate and complicated machining may be rapidly performed.

Particularly, the reconfigurable driving mechanism in which the rotary motion is maximized is applied to a single machining apparatus so that the travel range of a tool may be remarkably reduced when various processes are multiply performed. Therefore, the generation of the machining error is reduced so that machining precision is improved.

When various processes are multiply performed by a single machining apparatus, the travel range of a tool may be remarkably reduced Therefore, it is possible to reduce energy used for moving the tool to reduce product machining cost.

On the other hand, according to an exemplary embodiment of the present invention, the capsule type reconfigurable multifunctional machining apparatus capable of simultaneously or sequentially performing the laser process, the milling process, and the grinding process is provided to bring the development of a bio technology and information technology (IT) micromachining field that requires complicated and precise machining.

DETAILED DESCRIPTION OF THE EMBODIMENTS

Figure 1:
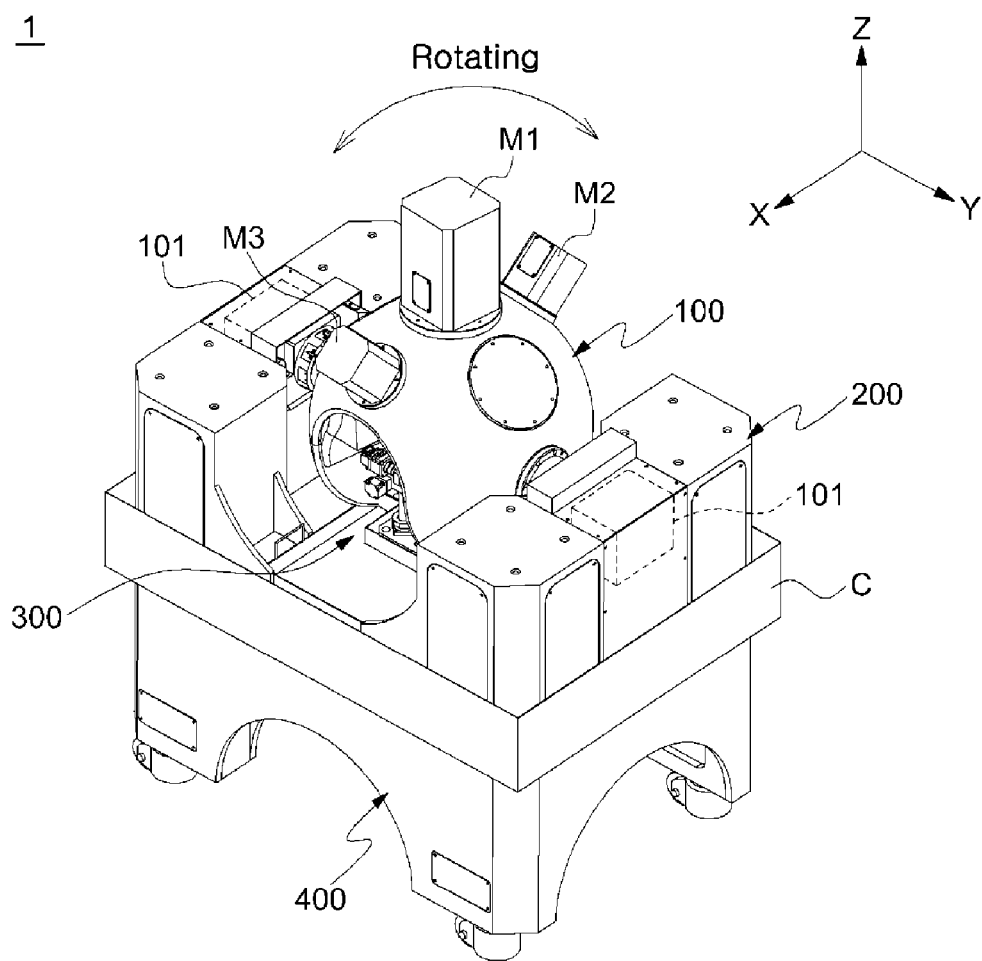
FIG. 1 is a perspective view of a capsule type reconfigurable multifunctional machining apparatus according to an exemplary embodiment of the present invention.

Hereinafter, referring to the drawings, a capsule type reconfigurable multifunctional machining apparatus according to an exemplary embodiment of the present invention will be described.

The advantages and characteristics of the present invention and a method of achieving the same will become more apparent by describing in detail exemplary embodiments with reference to the accompanying drawings. However, the present invention is not limited to the exemplary embodiments disclosed hereinafter but has many variations. The exemplary embodiments described hereinafter are provided to make the disclosure of the present invention complete and to completely inform to a person of ordinary skill in the art the scope of the present invention. In addition, in describing the present invention, when it is determined that a related publicly known technology may blur the main subject of the present invention, detailed description thereof will be omitted.

FIG. 1 is a perspective view of a capsule type reconfigurable multifunctional machining apparatus according to an exemplary embodiment of the present invention.

Referring to FIG. 1, a capsule type reconfigurable multifunctional machining apparatus 1 includes a rotating frame 100 that rotates with a plurality of processing modules mounted toward an object to be machined and that has a capsule type body, a top frame 200 and a bottom frame 400 for supporting the rotating frame under the rotating frame, and a stage unit 300 in which an object to be machined is settled and whose height may be controlled.

The rotating frame 100 is formed of the capsule type body and is rotated by frame drivers (for example, motors) mounted on both sides through the top frame 200.

A plurality of processing modules may be mounted on the rotating frame 100. For example, a laser processing module M1, a milling processing module M2, a grinding processing module M3 may be installed to run parallel with each other.

The top frame 200 and the bottom frame 400 support the rotating frame under the rotating frame to secure machining stability and to perform a vibration proof function that absorbs the vibration generated during the operation of the rotating frame or the processing modules.

Particularly, the top frame 200 supports the both ends of the rotating frame so that the rotating frame 100 may rotate and the bottom frame 400 is combined with the bottom of the top frame 200 to support the top frame 200. Vibration proof members are interposed in the positions where the bottom frame 400 and the top frame 200 contact each other.

A square band-shaped connection cover (C) may be detachably connected to the combination line of the top frame 200 and the bottom frame 400.

A stage unit 300 is inserted into and fixed to the internal center of the top frame so that the object to be machined is settled. Particularly, the stage unit 300 may control the height of the object to be machined and an X-Y stage or a rotary stage may be selectively mounted in the stage unit 300.

Here, the X-Y stage means an apparatus capable of controlling the displacement of the object to be machined in a horizontal two axes direction (i.e., an X-Y axes direction) and the rotary stage means an apparatus capable of rotating the object to be machined around the central axis.

Figure 2:
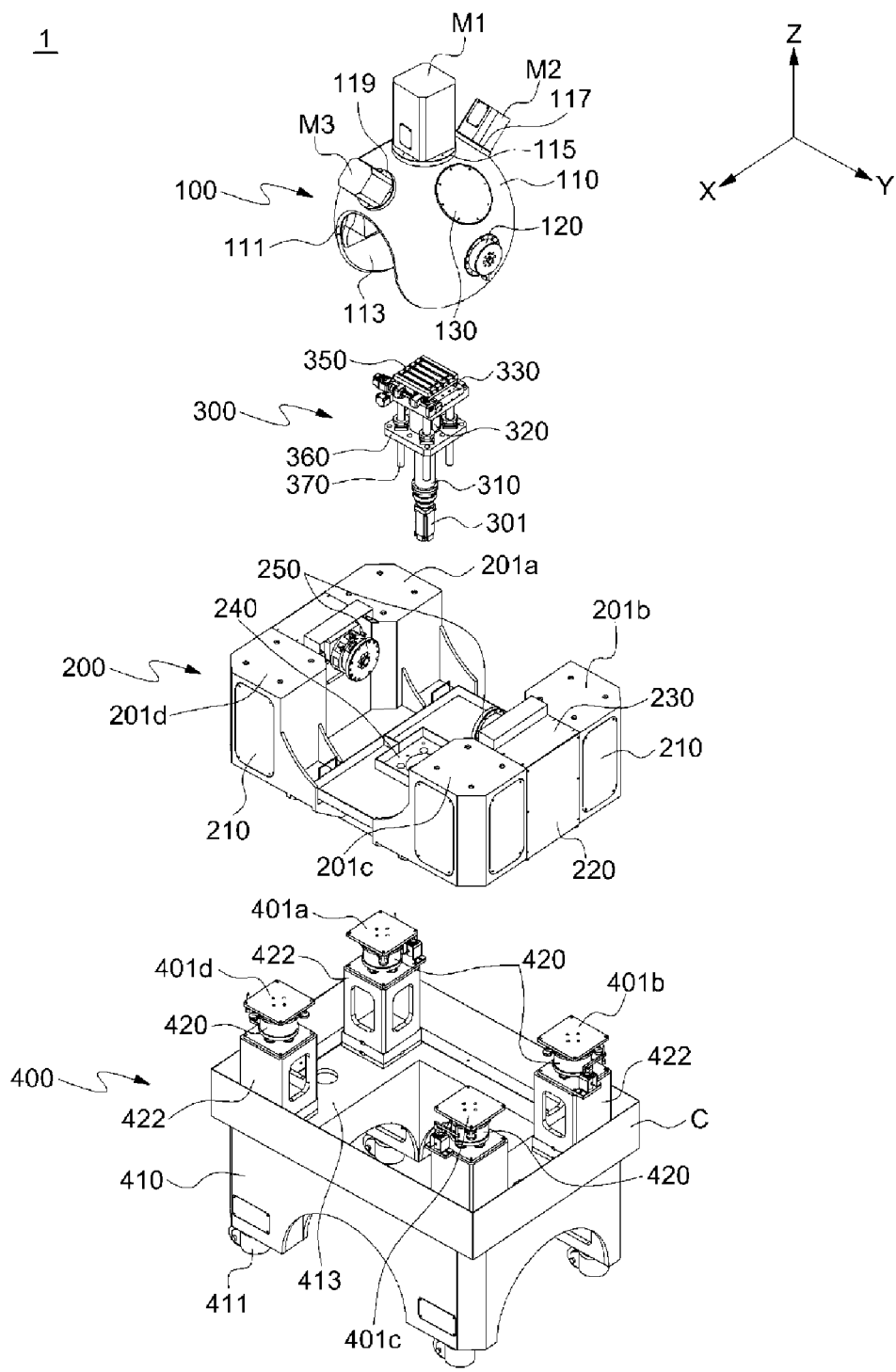
FIG. 2 is an exploded perspective view of a capsule type reconfigurable multifunctional machining apparatus according to an exemplary embodiment of the present invention.

FIG. 2 is an exploded perspective view of a capsule type reconfigurable multifunctional machining apparatus according to an exemplary embodiment of the present invention.

FIG. 2 illustrates the detailed shapes and the connection structure of the rotating frame 100, the stage unit 300, the top frame 200, and the bottom frame 400.

The rotating frame 100 is formed of a capsule type body 110. A driving shaft connecting unit 120 is provided in a direction (i.e., a Y axis direction) where the driving shaft connecting unit 120 is connected to the top frame 200 on both sides.

Processing modules capable of simultaneously or sequentially performing a plurality of processes on an object to be machined in accordance with a machining program input by a user are mounted in the rotating frame 100.

In detail, the processing modules may include a laser processing module M1, a milling processing module M2, and a grinding processing module M3.

According to the illustrated exemplary embodiment, a laser processing module mounting slot 115 in which the laser processing module M1 is mounted is provided in a vertical direction of the capsule type body 110. A milling processing module mounting slot 117 and a grinding processing module mounting slot 119 in which the milling processing module and the grinding processing module are mounted, respectively, are provided in positions separated from the laser processing module M1 back and forth in a rotating direction. The processing module mounting slots 115, 117, and 119 may be disposed in parallel to be separated from each other in a direction that coincides with the direction in which the capsule type body rotates.

Figure 3:
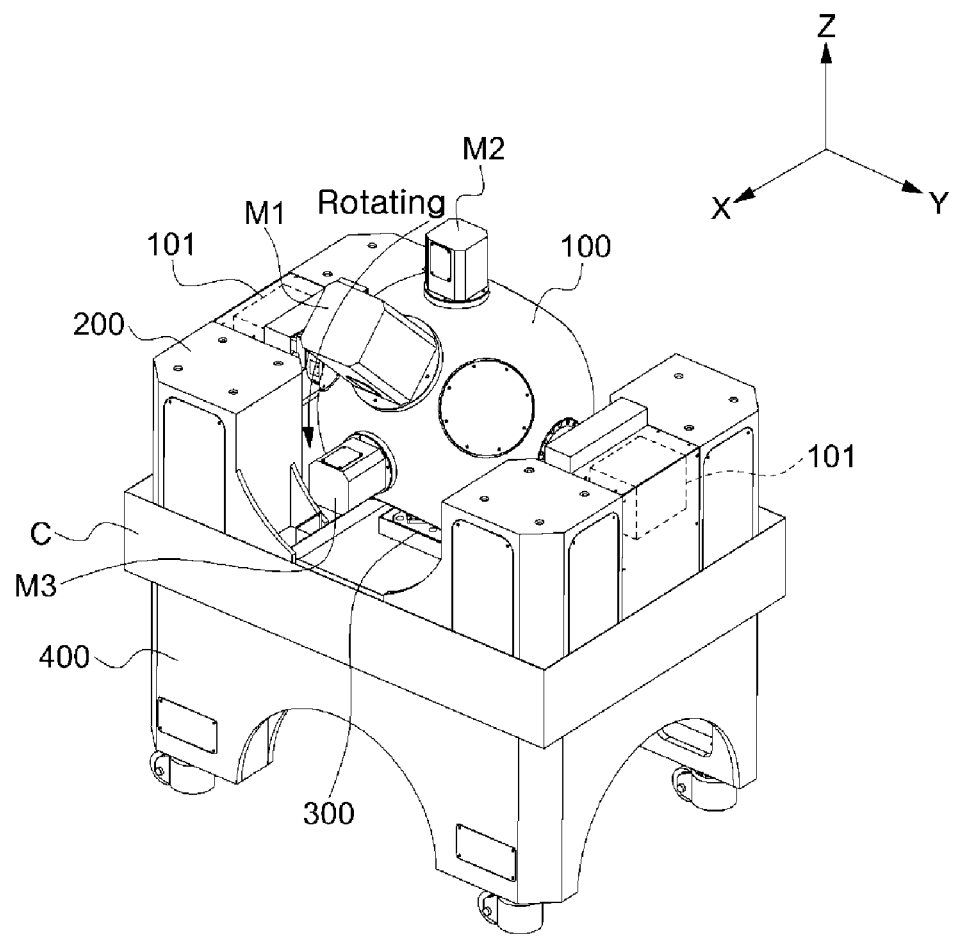
FIG. 3 is a perspective view illustrating a state in which the rotating frame of a capsule type reconfigurable machining apparatus according to an exemplary embodiment of the present invention rotates.

Particularly, FIG. 3 illustrates a state in which the rotating frame 100 illustrated in FIG. 1 rotates. As illustrated in FIG. 3, since the processing modules M1, M2, and M3 are disposed to be separated from each other so that the central angle is 45 degrees, when the grinding processing module M3 lies in a horizontal direction (i.e., an X axis direction), the milling processing module M2 is erected in a vertical direction (i.e., a Z axis direction). At this time, the laser processing module M1 is inclined at 45 degrees.

On the other hand, the capsule type body 110 of the rotating frame 100 includes an arc type cut part 111 cut back and forth from the center to the lower end in the rotating direction.

The arc type cut part 111 allows the stage unit 300 that protrudes upward through the bottom surface of the rotating frame 100 so that the height thereof is controlled and the rotating capsule type body 110 not to interfere each other.

Weight balance parts 113 that function as balance weights are provided on both sides of the arc type cut part 111. The capsule type body 110 is formed so that the inside thereof is mostly empty, however, is filled in the parts where the weight balance parts are provided.

On the other hand, circular covers 130 are provided on both sides of the capsule type body 110 of the rotating frame 100.

Here, the circular covers 130 may be used for maintaining and repairing the apparatus as well as for allowing a worker to confirm a machining state. The present invention is not limited to the above shape and structure.

Figure 4:
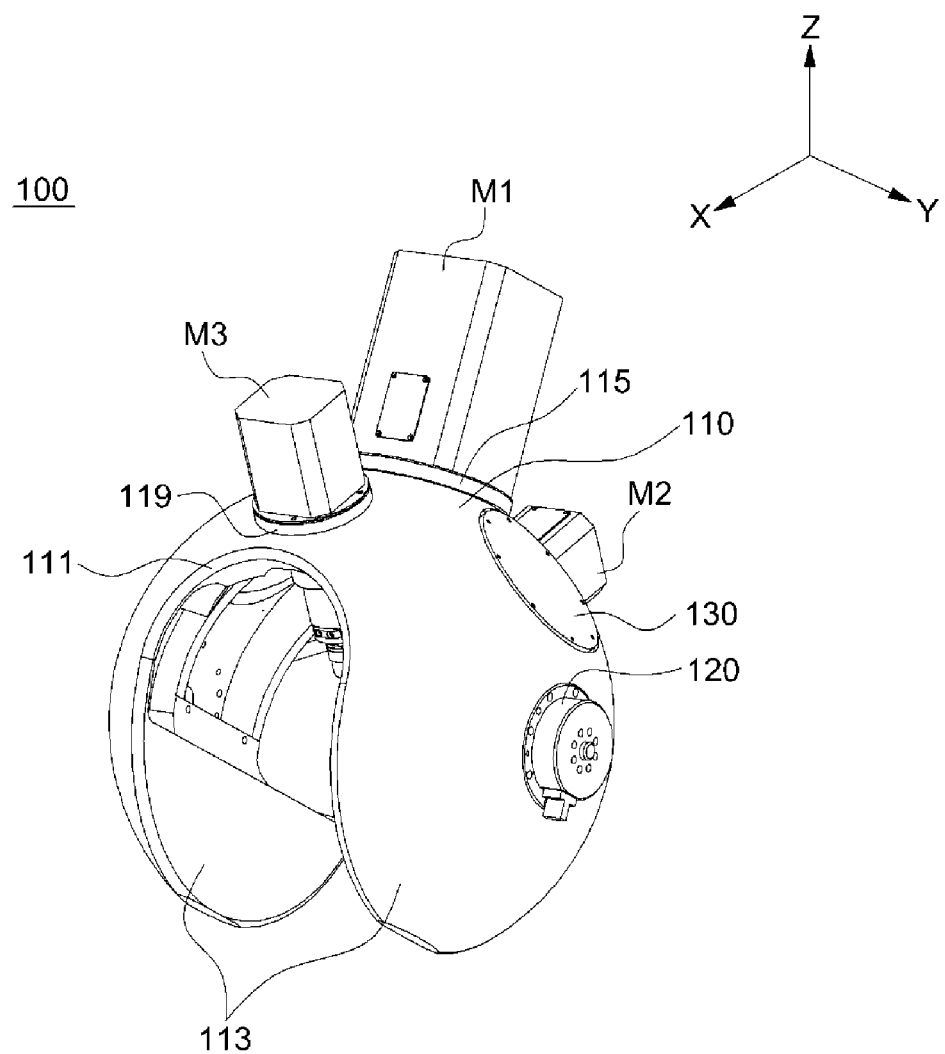
FIG. 4 is a partial perspective view illustrating the rotating frame of a capsule type reconfigurable machining apparatus according to an exemplary embodiment of the present invention.

FIG. 4 is a partial perspective view illustrating the rotating frame of a capsule type reconfigurable multifunctional machining apparatus according to an exemplary embodiment of the present invention. The detailed shape and structure of the above-described rotating frame 100 will be confirmed through FIG. 4.

The top frame 200 is a member for supporting both ends of the rotating frame 100 so that the rotating frame 100 may rotate. As illustrated in FIG. 5, the top frame 200 is square, that is, rectangular and pocket-shaped supporting ground plates 201*a*, 201*b*, 201*c*, and 201*d* that protrude upward are provided at the edges of the rectangle.

The supporting ground plates 201*a*, 201*b*, 201*c*, and 201*d* are positioned in the parts that face vibration proof members 420 fixed to the bottom frame 400.

The bottom frame 400 as a member for supporting the top frame 200 on the bottom of the top frame 200 is put on the ground (particularly, the bottom of a working place) to support the top frame 200 thereunder. The bottom frame 400 is square, that is, rectangular to correspond to the shape and size of the top frame 200 and protruding ends 422 that protrude upward are provided at the edges of the rectangle. The vibration proof members 420 are fixedly disposed on the top surfaces of the protruding ends 422.

The supporting ground plates 201*a*, 201*b*, 201*c*, and 201*d* of the above-described top frame 200 are pocket-shaped in order to insert the protruding ends 422 and the vibration proof members 420 of the bottom frame 400 thereinto.

Particularly, vibration proof member connection plates 401*a*, 401*b*, 401*c*, 401*d* are provided on the top surfaces of the vibration proof members 420 fixed to the bottom frame 400 so that the vibration proof member connection plates face and contact the bottom surfaces of the supporting ground plates 201*a*, 201*b*, 201*c*, and 201*d*. Therefore, vibration (or impact) transmitted from the top frame 200 may be effectively absorbed through the vibration proof members 420.

Furthermore, the vibration proof members 420 may be disposed at the edges of the rectangle that contacts the top frame 200 and the bottom frame 400 in the same line (i.e., the same height) to correspond to the height of the driving shaft of the rotating frame 100. Such a structure may be performed by properly controlling the heights of the supporting ground plates of the top frame and the protruding ends of the bottom frame.

On the other hand, detachable quadrangle covers 210 are provided on the side surfaces of the supporting ground plates 201*a*, 201*b*, 201*c*, and 201*d* of the top frame 200 and rotating frame connecting units 250 are provided in a direction where the driving shaft of the rotating frame 100 is connected.

Rotating frame drivers (reference numeral 101 of FIG. 1) are fixedly disposed in the extended line of the rotating frame connecting units 250 on both sides of the top frame 200. Here, motors capable of rotating the rotating frame may be used as the rotating frame drivers.

Side covers 220 may be detachably provided on the outside to which the rotating frame drivers are fixed and top covers 230 may be detachably provided on the top.

Figure 5A:
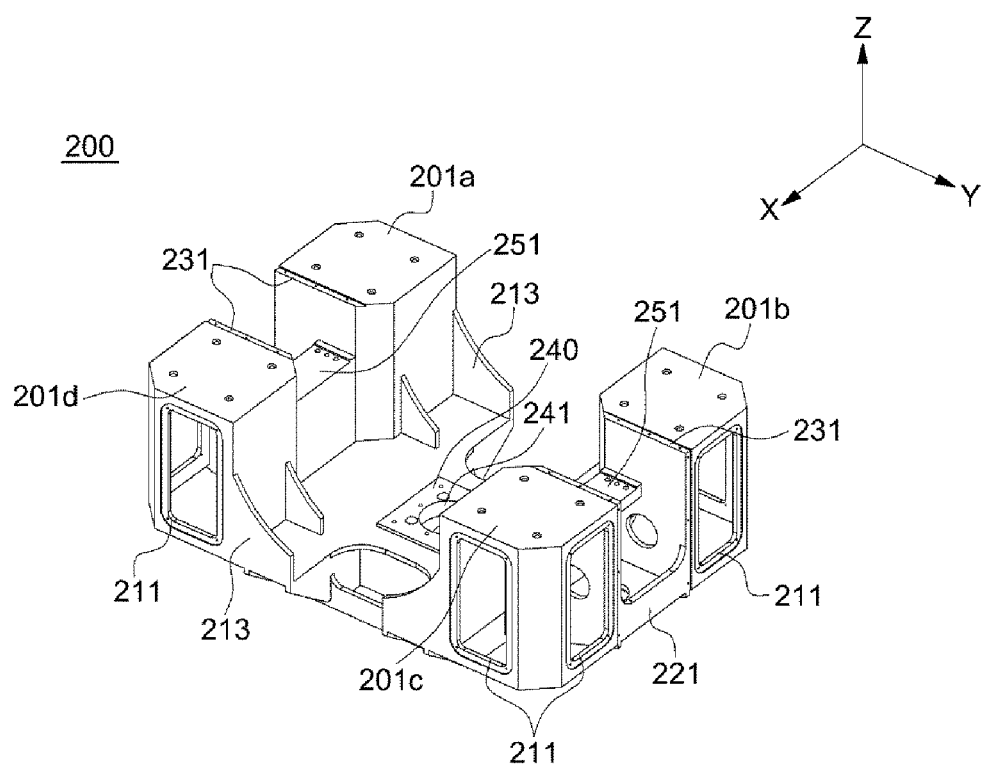
FIG. 5A is a partial perspective view illustrating the top frame of a capsule type reconfigurable multifunctional machining apparatus according to an exemplary embodiment of the present invention.
Figure 5B:
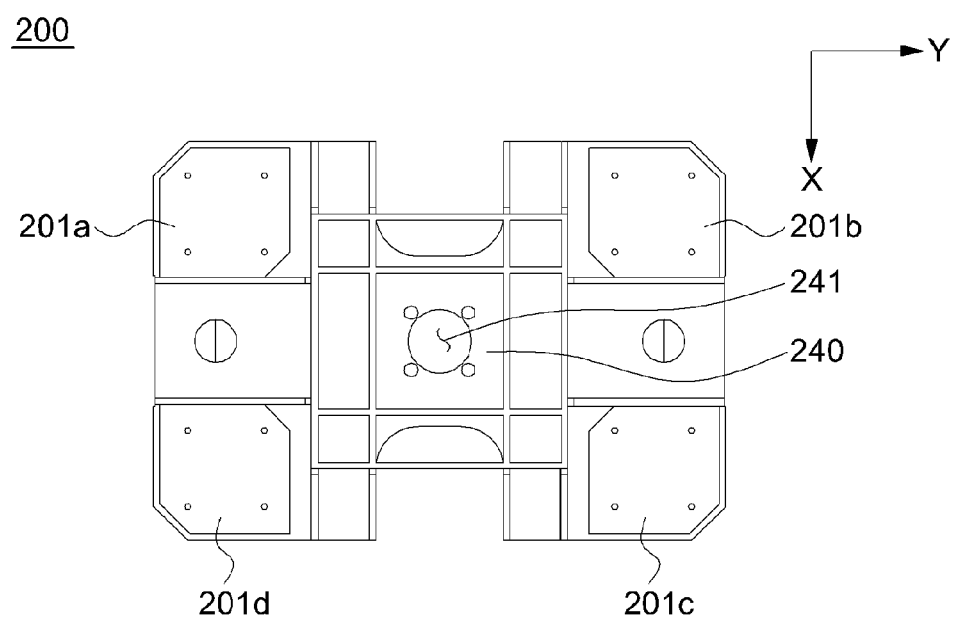
FIG. 5B is a rear view of the top frame of a capsule type reconfigurable multifunctional machining apparatus according to an exemplary embodiment of the present invention.

The shape and structure of the top frame 200 may be concretely confirmed through FIG. 5A that is a partial perspective view illustrating the top frame of a capsule type reconfigurable multifunctional machining apparatus according to an exemplary embodiment of the present invention and FIG. 5B that is a rear view of the top frame of a capsule type reconfigurable multifunctional machining apparatus according to an exemplary embodiment of the present invention.

A stage unit mounting unit 240 into which the stage unit 300 is inserted and mounted is provided in the center of the top frame 200.

The stage unit mounting unit 240 is combined with the connecting plate 360 of the stage unit 300 and an installation hole (reference numeral 241 of FIG. 5B) through which the ascending shaft 310 of the stage unit 300 is installed is provided in the stage unit mounting unit 240.

The bottom frame 400 includes supports 411 in the parts that contact the ground and may further include a moving wheel on one side of each of the supports 411. The above is for mobility of the apparatus. A bottom frame supporting member 410 is provided on the supports 411 provided at the edges of the rectangle along the circumference.

Referring to FIG. 2, the lower end of the bottom frame supporting member 410 is arch-shaped. The above is an exemplary shape for reducing the weight of the apparatus and for improving structure stiffness and the present invention is not limited to the above.

In addition, a horizontal end 413 may be provided at the upper end of the bottom frame supporting member 410 along the internal circumference. The horizontal end 413 allows the protruding ends 422 fixed with the vibration proof members 420 protruded upward to be stably disposed.

The stage unit 300 is inserted into and fixed to the internal center of the top frame so that the object to be machined is settled therein.

Particularly, the stage unit 300 includes an ascending driver 301 and the ascending shaft 310 in order to control the height of the object to be machined.

The stage unit 300 may selectively change the X-Y stage or the rotary stage to use the changed X-Y stage or rotary stage so that the object to be machined may be settled in various forms to be fixed. Therefore, various types of processes may be performed in a single machining apparatus.

The stage unit 300 will be described in detail with reference to FIGS. 6 to 9.

Figure 6:
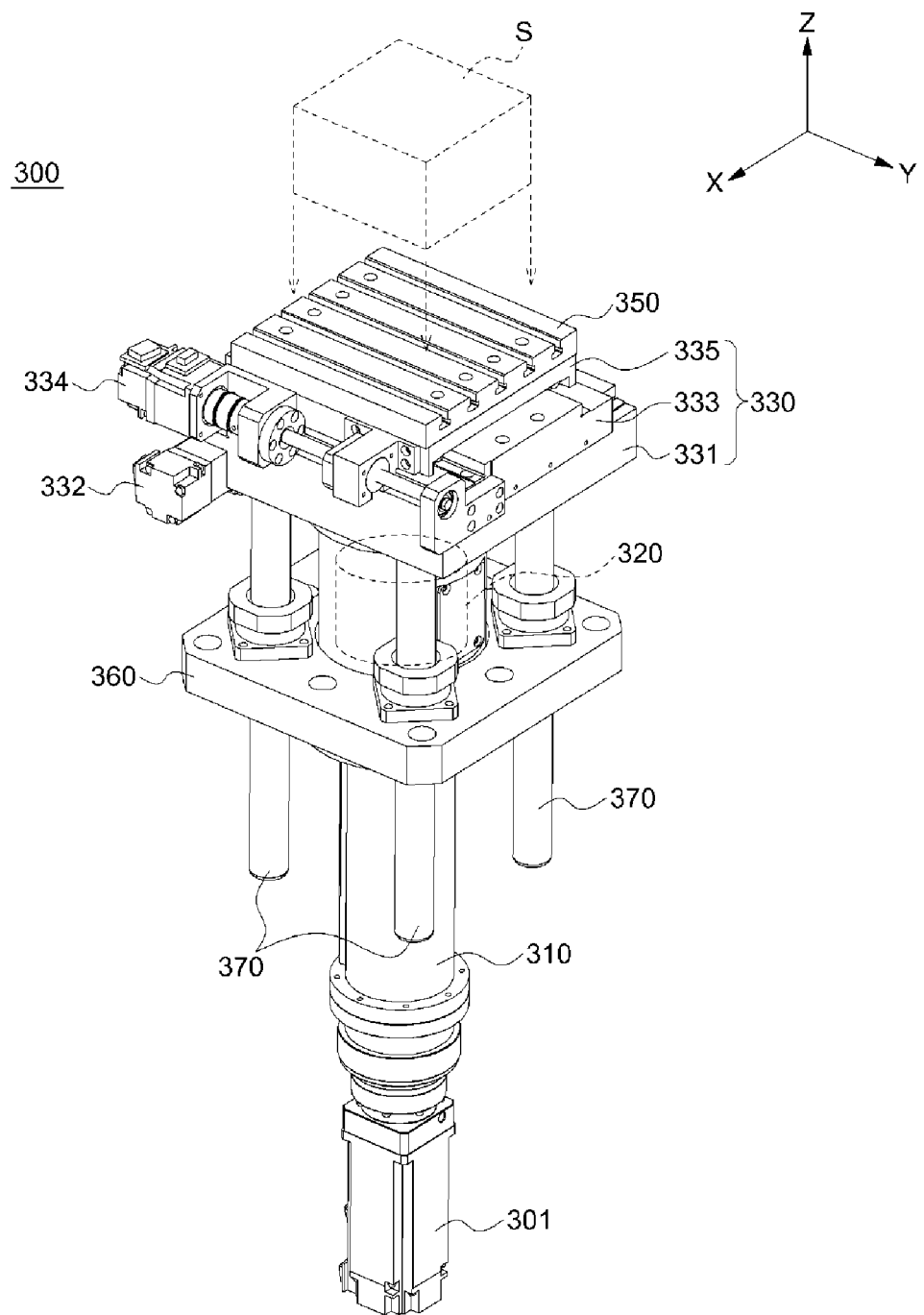
FIG. 6 is a partial perspective view illustrating the stage unit of a capsule type reconfigurable machining apparatus according to an exemplary embodiment of the present invention.

FIG. 6 is a partial perspective view illustrating the stage unit of a capsule type reconfigurable machining apparatus according to an exemplary embodiment of the present invention.

As briefly described with reference to FIG. 2, the stage unit 300 is inserted into and fixed to the stage unit mounting unit (reference numeral 240 of FIG. 2) provided in the top frame (reference numeral 200 of FIG. 2). For this purpose, the stage unit 300 includes the connecting plate 360 fixed thereto to face the stage unit 300.

The stage unit 300 includes the ascending shaft 310 mounted through the center of the connecting plate 360 in a vertical direction and the ascending driver 301 for providing torque at the lower end of the ascending shaft 310.

Here, a motor whose rotating direction may be electrically controlled may be used as the ascending driver 301 and various other torque generating units may be used.

The ascending shaft 310 receives torque of the ascending driver 301 to expand (or advance and retreat) in a vertical direction (i.e., a Z axis direction). The operating principle of the ascending shaft 310 by the ascending driver 301 will be described in detail with reference to FIG. 9.

A rotary stage driver 320 is mounted on the ascending shaft 310 in a coaxial direction. The rotary stage driver 320 is not operated when the X-Y stage 330 is used and is operated when the rotary stage is used. A motor for generating torque may be used as the rotary stage driver 320.

A plurality of guide rods 370 for guiding an ascending path are disposed around the ascending shaft 310 disposed through the center of the connecting plate 360. The four guide rods 370 are disposed to be rectangular at the edges of the connecting plate 360. However, the above is only an exemplary embodiment and the guide rods 370 may be differently formed.

On the other hand, the X-Y stage 330 in which the object to be machined is fixedly settled is provided at the upper end of the stage unit 300.

A support block 350 is detachably disposed on the X-Y stage 330 and an object S to be machined may be firmly fixed on the top surface of the support block 350. As described above, the fixed position of the object S to be machined may be variably controlled by driving the X-Y stage in the X-Y plane.

The X-Y stage 330 includes a first transfer block 333 transferred from the top of a base block 331 in the X axis direction and a first transfer block driver 332 for providing driving power required for the back and forth transfer of the first transfer block. The X-Y stage 330 includes a second transfer block 335 transferred from the top of the first transfer block 333 in the Y axis direction and a second transfer block driver 334 for providing driving power required for the back and forth transfer of the second transfer block. Here, motors may be used as the first transfer block driver 332 and the second transfer block driver 334.

Figure 7A:
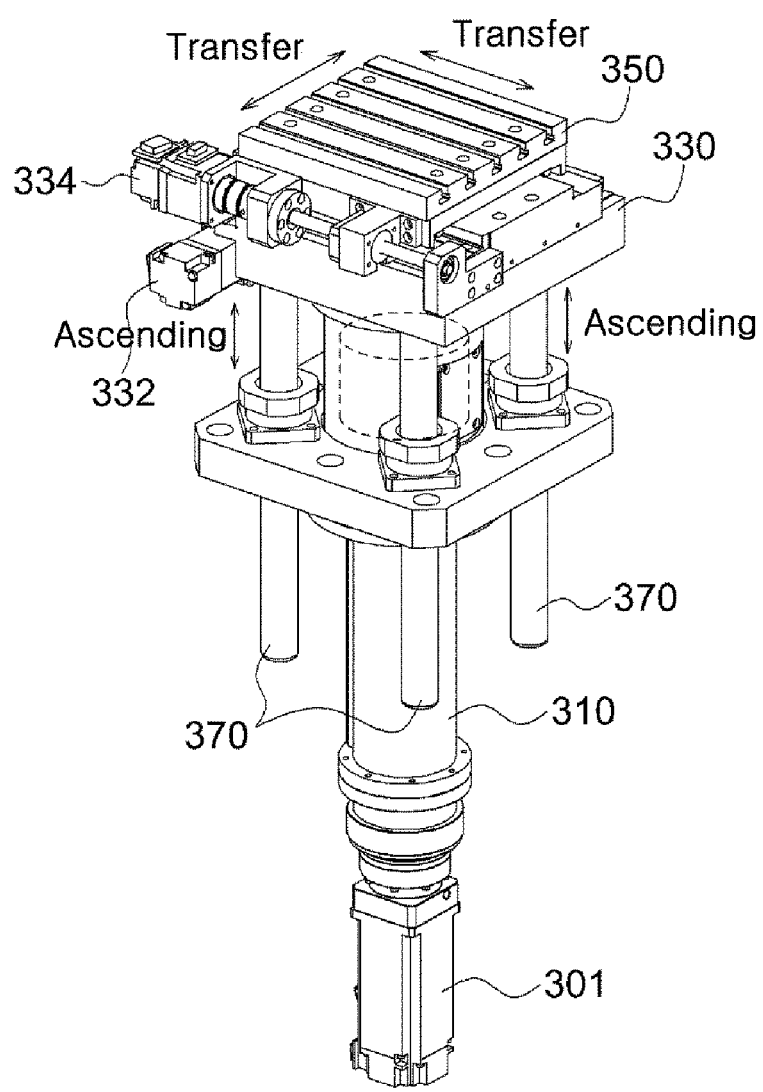
FIG. 7A is a perspective view illustrating a use state of the stage unit of a capsule type reconfigurable multifunctional machining apparatus according to an exemplary embodiment of the present invention.
Figure 7B:
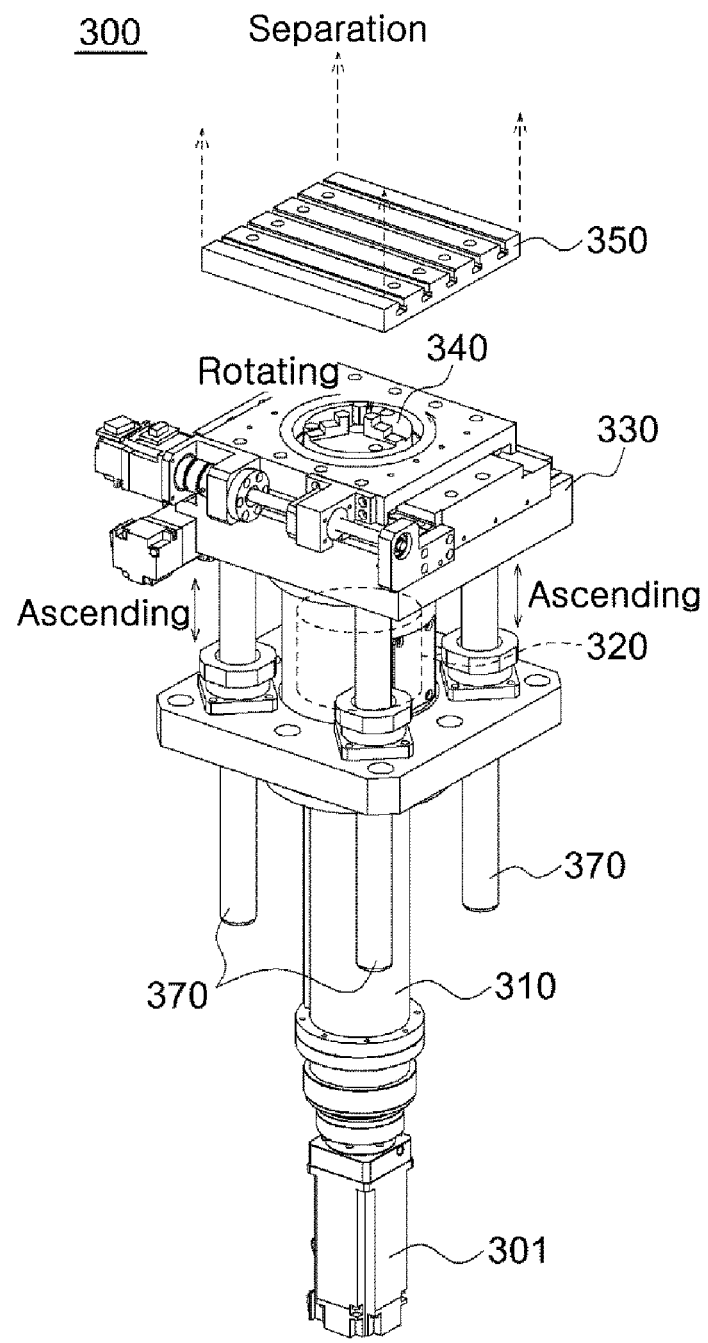
FIG. 7B is a perspective view illustrating another use state of the stage unit of a capsule type reconfigurable multifunctional machining apparatus according to an exemplary embodiment of the present invention.

FIG. 7A and FIG. 7B are perspective views illustrating two use types of the stage unit of a capsule type reconfigurable multifunctional machining apparatus according to an exemplary embodiment of the present invention.

The X-Y stage method illustrated in FIG. 7A is the same as described in FIG. 6. FIG. 7B illustrates that the rotary stage method is applied instead of the X-Y stage method.

When the rotary stage method is applied in accordance with a machining condition or the selection of a worker, as shown in FIG. 7B, the support block 350 mounted at the upper end of the X-Y stage 330 is separated.

Then, a rotary stage 340 is mounted in a groove provided on the top surface of the X-Y stage 330 in which the support block 350 is mounted.

Figure 8:
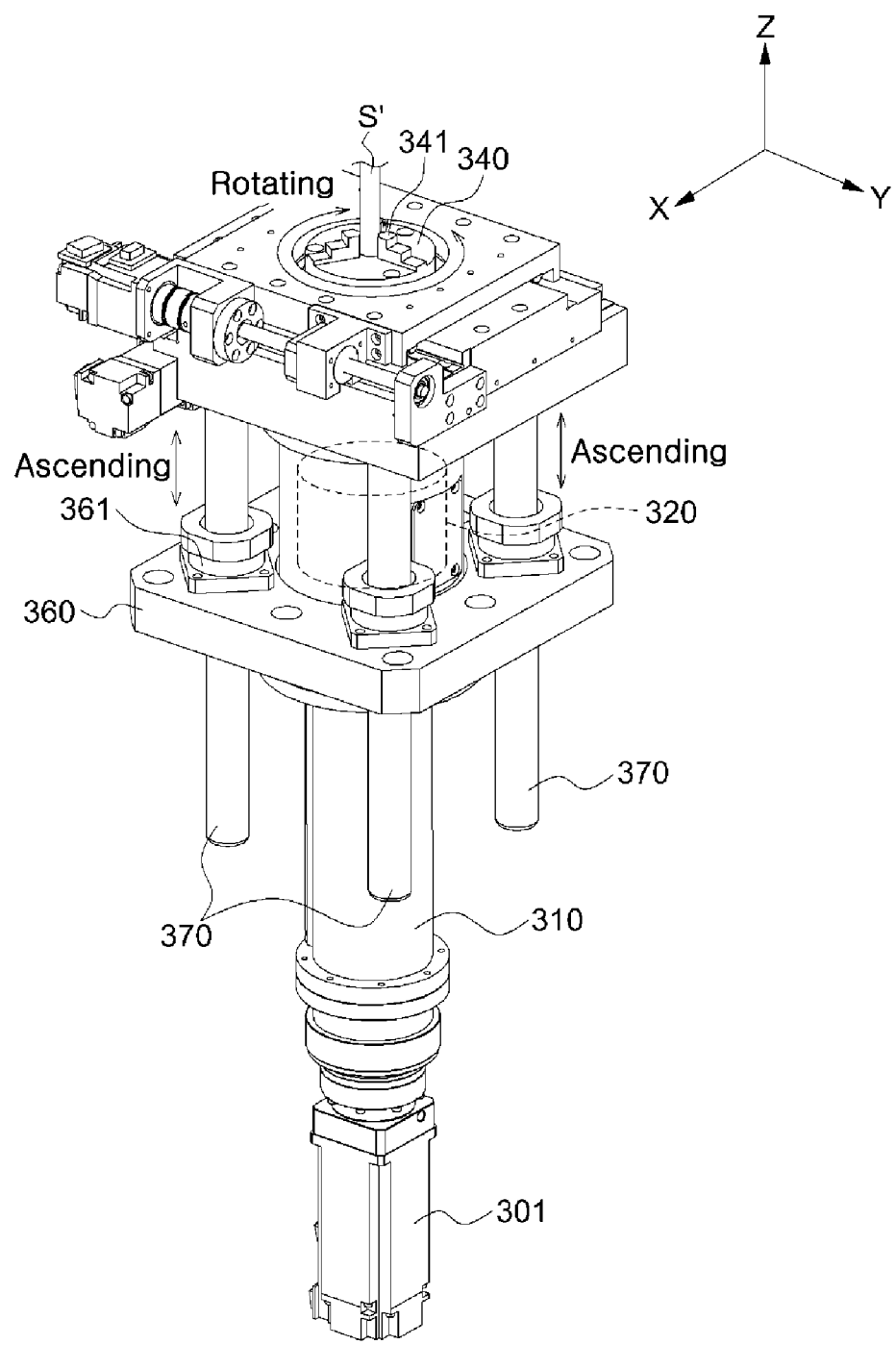
FIG. 8 is a perspective view illustrating that the stage unit of a capsule type reconfigurable multifunctional machining apparatus according to an exemplary embodiment of the present invention operates in a rotary stage method.

FIG. 8 is a perspective view illustrating that the stage unit according to an exemplary embodiment of the present invention operates in a rotary stage method.

As illustrated in FIG. 8, the rotary stage 340 receives torque from the rotary stage driver 320 mounted in the upper end of the ascending shaft 310 to rotate an object S' to be machined in the state where the lower end of the object S' to be machined is held.

For example, a chuck member including three jaws 341 in a circumferential direction may be used.

First, the three jaws 341 arranged in the circumferential direction are separated from each other and the object S' to be machined is settled in the center. Then, the three jaws 341 are made to come close to each other so that the position of the object S' to be machined is fixed to the center.

Then, the rotary stage driver 320 mounted in the upper end of the ascending shaft 310 is operated so that the driving shaft of the rotary stage driver 320 is coaxially connected to the ascending axis 310 to rotate in association with each other.

Therefore, the object S' to be machined rotates while being firmly fixed.

On the other hand, the object S' to be machined illustrated in FIG. 8 has a different shape from the object S to be machined illustrated in FIG. 6. As illustrated in FIG. 8, when the round bar-shaped object S' to be machined is machined, the chuck member including the three jaws 341 may be used.

Figure 9:
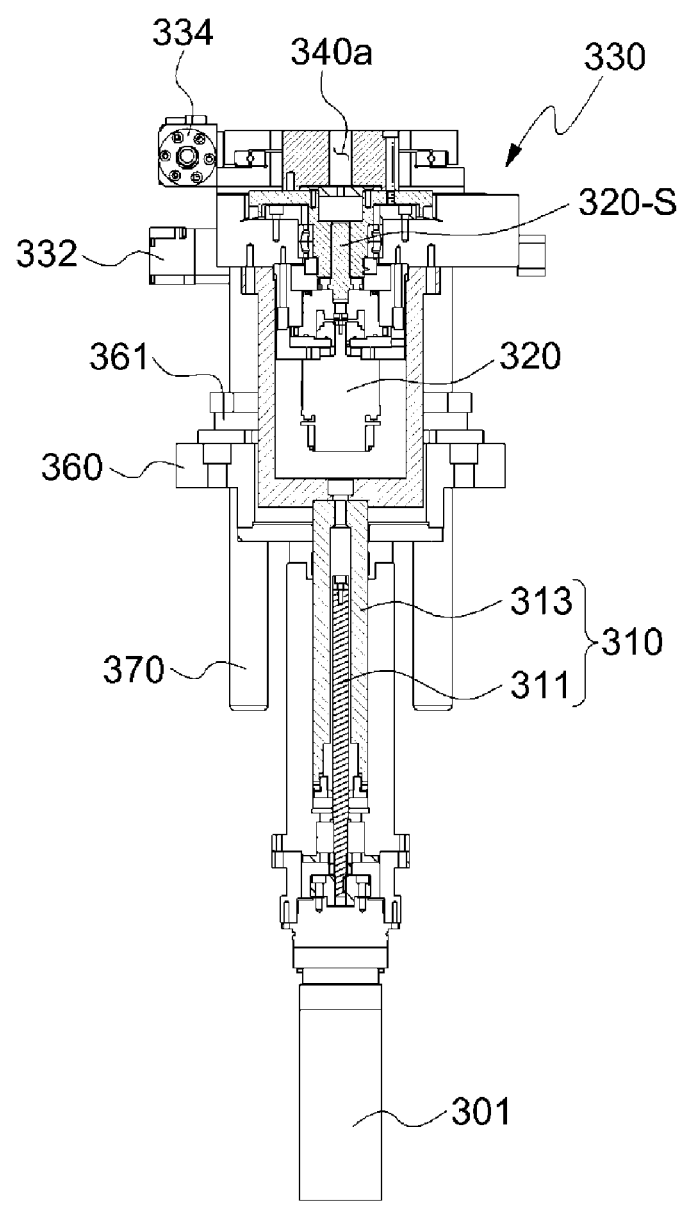
FIG. 9 is a vertical direction cross-sectional view of the stage unit of a capsule type reconfigurable multifunctional machining apparatus according to an exemplary embodiment of the present invention.

FIG. 9 is a vertical direction cross-sectional view of the stage unit according to an exemplary embodiment of the present invention.

Referring to FIG. 9, a screw member 311 connected to the ascending driver 301 rotates in accordance with the operation of the ascending driver 301 positioned at the lowermost end. A moving shaft member 313 screw combined with the screw member 311 while surrounding the outer circumference of the screw member 311 advances and retreats upward or downward in a vertical direction.

Therefore, the ascending shaft 310 including the screw member 311 and the moving shaft member 313 may expand in a vertical direction.

On the other hand, the ascending shaft 310 is disposed through the center of the connecting plate 360 and the plurality of guide rods 370 may be disposed at the edges of the rectangle of the connecting plate 360 outside the ascending shaft 310.

In addition, a bearing member 361 having a hollow space corresponding to the sectional shape and size of the guide rods 370 is disposed on the connecting plate 360. The guide rods 370 pass through the connecting plate 360 and the bearing member 361 to be connected.

A pocket-shaped housing is provided at the upper end of the ascending shaft 310. The rotary stage driver 320 for rotating the rotary stage is mounted in the pocket-shaped housing. That is, as confirmed by FIG. 9, the driving shaft 320-S of the rotary stage driver 320 is coaxially connected to the chuck member used as the rotary stage. Therefore, a hollow space 340a in which the chuck member used as the rotary stage is mounted is formed on the bottom surface in which and from which the support block (not shown) is mounted and separated to be opened upward in a vertical direction.

Figure 10:
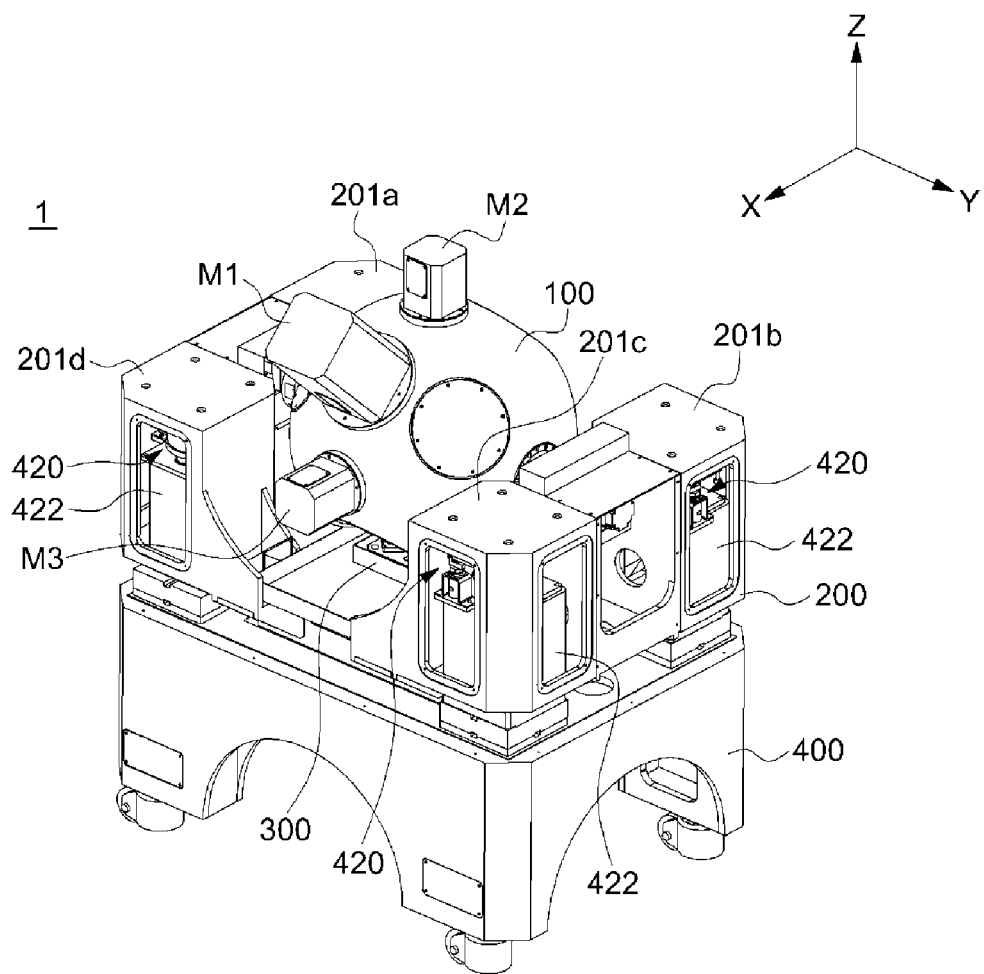
FIG. 10 is a perspective view illustrating the structure of vibration proof members interposed between the top frame and the bottom frame of a capsule type reconfigurable multifunctional machining apparatus according to an exemplary embodiment of the present invention.

FIG. 10 is a perspective view illustrating the structure of vibration proof members interposed between the top frame and the bottom frame of a capsule type reconfigurable multifunctional machining apparatus according to an exemplary embodiment of the present invention.

Referring to FIG. 10, a connection structure among the rotating frame 100 in which the laser processing module M1, the milling processing module M2, and the grinding processing module M3 are mounted, the top frame 200 for supporting the both ends of the rotating frame 100 so that the rotating frame 100 may rotate, and the bottom frame 400 for supporting the top frame 200 with the vibration proof members 420 interposed between the top frame 200 and the bottom frame 400 may be confirmed.

Figure 11:
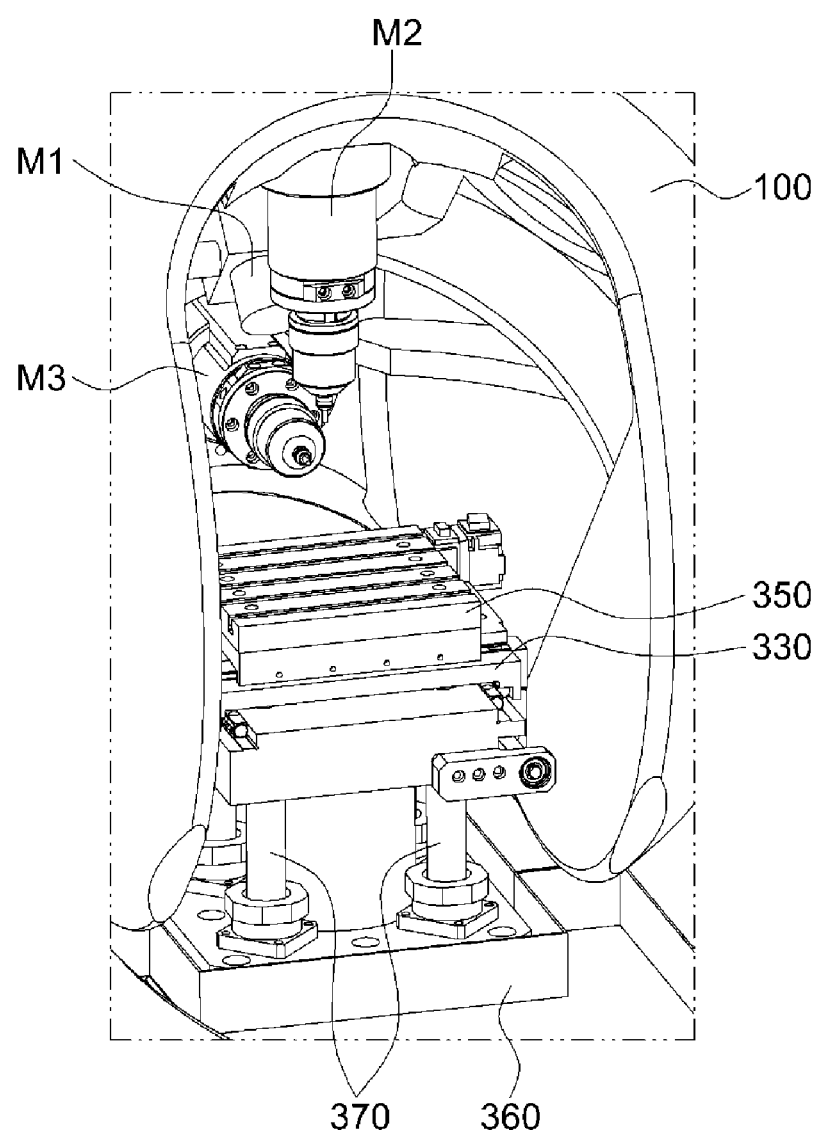
FIG. 11 is an enlarged view illustrating the internal structure of a capsule type reconfigurable multifunctional machining apparatus according to an exemplary embodiment of the present invention.

FIG. 11 is an enlarged view illustrating the internal structure of a capsule type reconfigurable multifunctional machining apparatus according to an exemplary embodiment of the present invention.

In the arc type cut part 111 of the rotating frame 100, when the X-Y stage 330 method is used, the support block 350 is fixedly disposed on the X-Y stage and the laser processing module M1, the milling processing module M2, and the grinding processing module M3 are disposed on the support block 350.

Although not shown, like in FIG. 6, the object S to be machined is fixedly settled on the top surface of the support block 350 and multifunctional machining may be smoothly performed on the object S to be machined.

As described above, in the capsule type reconfigurable machining apparatus according to an exemplary embodiment of the present invention, a reconfigurable driving mechanism in which a rotary motion is maximized is applied deviating from the conventional linear motion based machining mechanism so that more elaborate and complicated machining may be rapidly performed.

In addition, the reconfigurable driving mechanism in which the rotary motion is maximized is applied to a single machining apparatus so that the travel range of a tool may be remarkably reduced when various processes are multiply performed. Therefore, the generation of the machining error is reduced so that machining precision is improved.

When various processes are multiply performed by the single machining apparatus, the travel range of the tool may be remarkably reduced. Therefore, it is possible to reduce energy used for moving the tool and to reduce product machining cost.

Particularly, an exemplary embodiment of the present invention provides the capsule type reconfigurable multifunctional machining apparatus capable of simultaneously or sequentially performing the laser process, the milling process, and the grinding process to bring the development of a bio technology and information technology (IT) micromachining field that requires complicated and precise machining.

It is to be understood that the invention is not limited to the disclosed embodiments, but, the scope of the present invention will be represented by the appended claims rather than the above-described detailed description. In addition, it is to be interpreted that all of the changes and modifications drawn from the meaning and range of the claims and equivalent arrangements are included within the spirit and scope of the present invention.

<Description of symbols>

| | |
|---|---|
| S: object to be machined | |
| M1: laser processing module | |
| M2: milling processing module | |
| M3: grinding processing module | |
| 1: capsule type reconfigurable multifunctional machining apparatus | |
| 100: rotating frame | |
| 101: rotating frame driver | |
| 110: capsule type body | 111: arc type cut part |
| 113: weight balance | 115, 117, 119: processing module mounting slot |
| 120: driving shaft connecting unit | 130: circular cover |
| 200: top frame | |
| 201a, 201b, 201c, 201d: supporting ground plate | |
| 210: quadrangle cover | |
| 220: side cover | 230: top cover |
| 240: stage unit mounting unit | 250: rotating frame connecting unit |
| 300: stage unit | |
| 301: ascending driver | |
| 310: ascending shaft | 320: rotary stage driver |
| 330: X-Y stage | 331: base block |
| 332: the first transfer block driver | 333: the first transfer block |
| 334: the second transfer block driver | 335: the second transfer block |
| 340: rotary stage | 350: X-Y stage support block |
| 360: connecting plate | 370: guide road |
| 400: bottom frame | |
| 401a, 401b, 401c, 401d: vibration proof member connecting plate | |
| 410: bottom frame supporting member | |
| 411: support | 413: horizontal end |
| 420: vibration proof member | 422: protruding end |

What is claimed is:

1. A machining apparatus, comprising:
a rotating frame having a capsule-type body configured to partially encapsulate an object to be machined, in which capsule-type body a plurality of processing modules are installed such that processing tools of each of the processing modules are each able to machine, within the capsule-type body, an object to be machined, wherein a machining position and pose of the processing tools are controlled by rotation of the capsule-type body in forwards and backwards directions about an axis, and wherein the processing modules are installed in the capsule-type body so as to be spaced from one another in the forwards and backwards directions;

a top frame for rotatably supporting the capsule-type body, at opposite ends of the capsule-type body that are spaced along the axis, for rotation about the axis;

a bottom frame that is combined with the top frame under the top frame to support the top frame, wherein vibration absorption members for absorbing vibration generated during operation of the rotating frame or operation of the processing modules are installed in positions where the top frame is supported on the bottom frame; and a stage unit fixedly attached to the top frame and extending through the top frame at the internal center of the top frame, the stage unit provided to support the object to be machined so that the height in the vertical direction, relative to the top frame, of the supported object to be machined may be controllably adjusted, and in which stage unit a rotary stage or a support block of an X-Y stage are selectively utilized to support the object to be machined.

2. The machining apparatus of claim 1,
wherein the processing modules include a laser processing module, a milling processing module, and a grinding processing module, and
wherein the capsule-type body comprises:
  a laser processing module mounting slot in which the laser processing module is mounted such that a longitudinal direction of the laser processing module is perpendicular to the axis of rotation of the capsule type body;
  a milling processing module mounting slot in which the milling processing module is mounted, which milling processing module slot is spaced from the laser processing module slot in one of the forwards and backwards directions; and
  a grinding processing module mounting slot in which the grinding processing module is mounted, which grinding processing module slot is spaced from the laser processing module slot in the other of the forwards and backwards directions.

3. The machining apparatus of claim 2,
wherein the capsule type body comprises an arc shaped cut out portion extending through the capsule type body in the forwards and backwards direction, and from a center of the capsule type body to a lower end of the capsule type body in a vertical height direction, and
wherein the stage unit protrudes upward from the top frame and into the arc shaped cut out portion, and wherein the stage unit and the rotating capsule type body do not interfere with each other.

4. The machining apparatus of claim 2, wherein weight balances are provided on opposite ends of the arc shaped cut out portion to fill an internal space of the capsule type body.

5. The machining apparatus of claim 1, wherein the vibration absorption members are air cushions positioned at a height so as to correspond to the height location in the vertical direction of a driving shaft of the rotating frame, and are arrayed in a pattern forming a rectangle.

6. The machining apparatus of claim 5,
wherein the vibration absorption members are fixed to protruding ends of the bottom frame that protrude upward from a portion of the bottom frame, and
wherein pocket-shaped supporting ground plates into which the protruding ends are inserted, and which pocket-shaped supporting ground plates are supported on the vibration absorption members, are provided at edges of the top frame.

7. The machining apparatus of claim 1, wherein rotating frame drivers for transmitting torque to the capsule-type body through driving shafts connected to the opposite ends of the capsule-type body are mounted in the top frame.

8. The machining apparatus of claim 1,
wherein the stage unit is fixedly attached to the top frame at, and extends through the top frame at, a stage unit mounting unit provided in the top frame,
wherein the stage unit comprises:
  a connecting plate fixed to the stage unit mounting unit;
  an ascending shaft mounted such that a longitudinal axis thereof extends in a vertical direction and such that the ascending shaft extends through a center of the connecting plate, and causes the X-Y stage to move up and down via torque received from an ascending driver located at a lower end of the ascending shaft; and
  the X-Y stage, which X-Y stage is connected to an upper end of the ascending shaft, wherein the object to be machined is fixed to a top surface of the support block, and wherein the X-Y stage is configured to move the object to be machined in X and Y axes directions.

9. The machining apparatus of claim 8, wherein the stage unit comprises:
  a rotary stage driver mounted on the upper end of the ascending shaft; and
  the rotary stage, which rotary stage is for receiving torque from the rotary stage driver to rotate the object to be machined.

10. The machining apparatus of claim 9, wherein the rotary stage is a chuck member including a plurality of jaws, is used to support the object to be machined when the support block is separated from the X-Y stage, and is mounted in a groove provided in the X-Y stage.

11. The machining apparatus of claim 8, wherein the stage unit comprises a plurality of guide rods for guiding the up and down movement of the X-Y stage.

* * * * *